United States Patent [19]
Miyanaga

[11] Patent Number: 5,167,475
[45] Date of Patent: Dec. 1, 1992

[54] CORE DRILL

[75] Inventor: Masaaki Miyanaga, Ashiya, Japan

[73] Assignee: Kabushiki Kaisha Miyanaga, Japan

[21] Appl. No.: 837,079

[22] Filed: Feb. 18, 1992

[30] Foreign Application Priority Data

Feb. 19, 1991 [JP] Japan .................................. 3-24700

[51] Int. Cl.⁵ ............................................ B23B 51/04
[52] U.S. Cl. ................................. 408/204; 408/201; 408/703
[58] Field of Search ................. 408/201, 203–209, 408/703

[56] References Cited

U.S. PATENT DOCUMENTS

| | | |
|---|---|---|
| 3,104,564 | 9/1963 | Hougen ................................. 408/86 |
| 3,162,067 | 12/1964 | Koons et al. . |
| 3,262,474 | 7/1966 | Enders . |
| 3,360,025 | 12/1967 | Gallo . |
| 4,968,189 | 11/1990 | Pidgeon ........................... 408/209 X |

FOREIGN PATENT DOCUMENTS

| | | | |
|---|---|---|---|
| 0292107 | 12/1990 | Japan ................................. 408/204 |
| 620103 | 3/1949 | United Kingdom . |
| 2236697 | 4/1991 | United Kingdom ................ 408/703 |

*Primary Examiner*—Steven C. Bishop
*Attorney, Agent, or Firm*—Marshall, O'Toole, Gerstein, Murray & Bicknell

[57] ABSTRACT

This disclosure relates to a drill including a base having a shank and a tubular core body provided with hole-cutting blades at the peripheral edges of both openings, which are coupled together via a coupling ring between the base and the end of one of the openings of the core body, allowing the selective use of both sets of the core body's hole-cutting blades for hole cutting. The drill comprises a base which has a shank and a core body mounting part formed in it; hook-shaped locking grooves which are formed in the peripheral surface of the core body mounting part; a cylindrically-shaped core body which is provided with hole-cutting blades around the peripheral edges of both end openings; a coupling ring from the inner surface of which project locking protrusions that lock with the locking grooves, and which is selectively placed in a designated position on the inner surface of the end of the two openings in the core body; and stopper balls which are arranged inside the core body mounting part and which are supported by springs so that they are in and out of the locking grooves and hold the locking protrusions at the locking end points inside the locking grooves.

1 Claim, 3 Drawing Sheets

CORE DRILL

BACKGROUND OF THE INVENTION

This invention relates to a core drill which first uses a center drill to drill a center hole and then uses a core body which is combined in a single unit with the center drill to cut a large-diameter hole in a concentric circle around the center drill.

PRIOR ART

Up until now a wide variety of drills have been developed and marketed for use in the cutting of large-diameter holes. Core drills, which combine a cylindrically-shaped core body provided with hole-cutting blades around the peripheral edge of its opening in a single unit with a center drill, and which first uses the center drill to drill a center hole and then uses the core body to cut a large-diameter hole, have been widely used in order to smoothly execute the work of cutting large-diameter holes.

FIG. 4 is an exploded perspective view of a core drill showing one example of a prior art core drill.

In the drawing, a base 1 has a shank 2, supported by the chuck of a drive shaft (not shown) at the center of its top surface, and a core body mounting part 3 provided with a shoulder part 4, is formed in the peripheral surface of the base 1.

Locking bayonet-type grooves 5 are formed at two locations at equal intervals on the peripheral surface of the core body mounting part 3, and each of these locking grooves 5 is comprised of a vertical groove 5a formed in the generating line direction from the bottom edge of the core body mounting part 3 and a horizontal groove 5b formed so that it continues from the vertical groove 5a in the peripheral direction in the shape of a hook.

A core body 6 is coupled to the base 1, and a tapered mounting tube 7 into which the core body mounting part 3 extends, is provided at the top of this core body. Locking protrusions 8 project from the inside surface at the top of this mounting tube 7 so that they engage in and release in and out of the locking grooves 5, and cutting blades 9 comprised of cemented carbide bits are provided at the bottom edge of the core body 6.

A center drill 10 is mounted on the base 1, and the base of the drill is inserted into a mounting hole 11 provided in the center of the bottom surface of the base 1 and secured in such as manner that it is freely mountable and removable by a securing set screw 12 screwed in from the side with respect to the mounting hole 11.

The groove surface of the horizontal groove 5b of the locking grooves 5 is formed so that, as it approaches the end, it slants gently upwardly and at the same time gradually becomes shallower. After fitting the core body mounting part 3 into the mounting tube 7 so that the locking protrusions 8 enter the vertical grooves 5a of the locking grooves 5, by turning the base 1 and the core body 6 relative to each other so that the locking protrusions 8 move inside the ends of the horizontal grooves 5b, as the locking protrusions 8 move inside the horizontal grooves 5b, they are guided by the gently upward slanting groove surfaces, thus causing the core body 6 to be drawn upward. In addition to strengthening the contact relationship between the top edge of the mounting tube and the shoulder part 4, the locking protrusions 8 reach the gradually shallower ends of the horizontal grooves 5b and press against the groove surfaces, thus eliminating any looseness or play between the base 1 and the core body 6 and providing a secure coupling.

With the core drill having the composition described above, although the base and the core body can be coupled and separated easily by a one-motion operation, thus providing convenient handling, because the composition is designed so that the hole-cutting blades of the core body are provided at the peripheral edge of the opening at one end of the core body and the opening at the other end is used for coupling with the base, since a core drill used in applications such as a rotary hammer drill, in which breakage of the hole-cutting blades occurs easily, if hole-cutting becomes impossible as the result of breakage of the hole-cutting blades or for some other reason, it is necessary to replace the core body, and it is desirable to separately prepare spare core bodies. In addition, because the hole-cutting blades of the core drill are fabricated in accordance with the characteristics of the material in which the hole is going to be cut, in order to cut holes in materials having different physical properties, it is also necessary to prepare separate core bodies on which the hole-cutting blades are different, even if the diameters of the holes being cut are the same.

Furthermore, because breakage of the hole-cutting blades is a serious problem, the disposal of the core body is also a considerable economic loss.

In consideration of the problems described above, the objective of this invention is to propose a core drill in which hole-cutting blades are provided on the peripheral edges of both end openings of the core body, thus achieving both convenient handling and excellent economy.

SUMMARY OF THE INVENTION

An essential feature of this invention to achieve the objective stated above, comprises a core drill characterized in that it includes a base which has a shank in the center of its top surface and a core body mounting part formed in its peripheral surface; hook-shaped locking grooves which are each comprised of a vertical groove followed by a horizontal groove and which are formed in multiple locations on the peripheral surface of the core body mounting part; a cylindrically-shaped or tubular core body which is provided with hole-cutting blades around the peripheral edges of both end openings; a coupling ring from the inner surface of which project locking protrusions that lock with the locking grooves, and which is selectively fitted into a designated position on the inner surface of the end of the two openings in the core body; and locking or stopper balls which are arranged inside the core body mounting part and which are supported by springs so that they move in and out of the locking grooves and hold the locking protrusions at the locking end points inside the locking grooves.

Because a coupling ring fits into the inner surface of the end of the openings in the core body on the end opposite the hole-cutting blades which are being used, and the base and the core body are coupled together via this coupling ring, it is possible to use both of the sets of hole-cutting blades provided at the peripheral edges of the two end openings of the core body, thus improving work efficiency.

When coupling together the base and the core body, because the locking protrusions inside the locking grooves are held in place at the locking end points by stopper balls which project into the locking grooves under the force of springs, there is no looseness or play in the coupling relationship between the base and the core body during the cutting of a hole using the core drill, thus providing high stability.

BRIEF DESCRIPTION OF THE DRAWINGS

The following is a detailed explanation of an embodiment of this invention based on the accompanying drawings, wherein.

DESCRIPTION OF THE INVENTION

Figure 4:
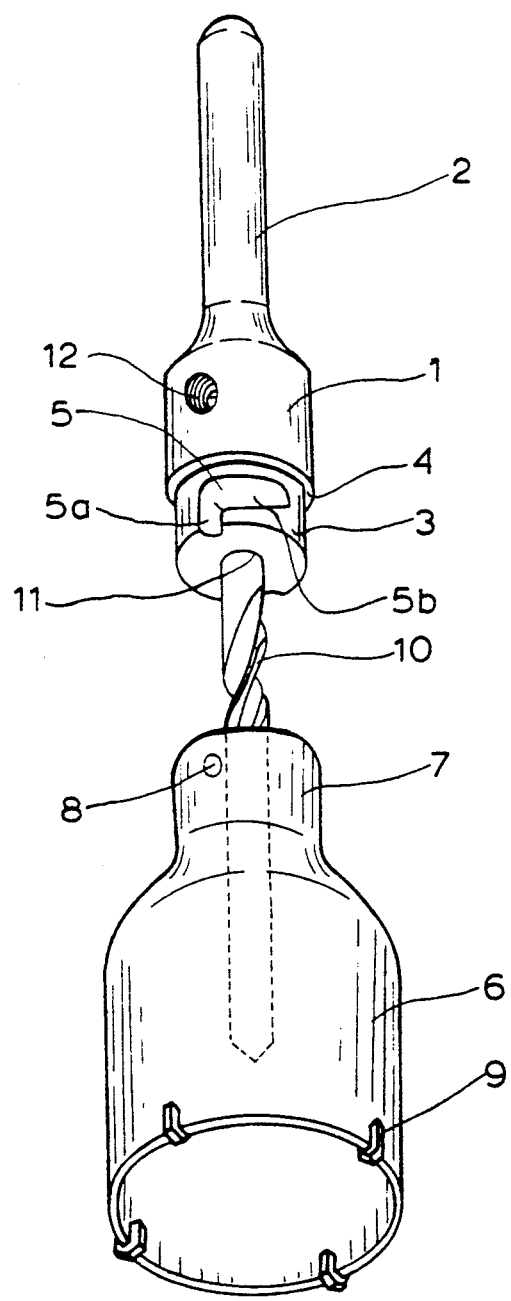
FIG. 4 is an exploded perspective view of a core drill of the prior art.

In the following explanation, parts which are common or equivalent to those already described in connection with FIG. 4 are indicated by the same reference numerals.

Figure 1:
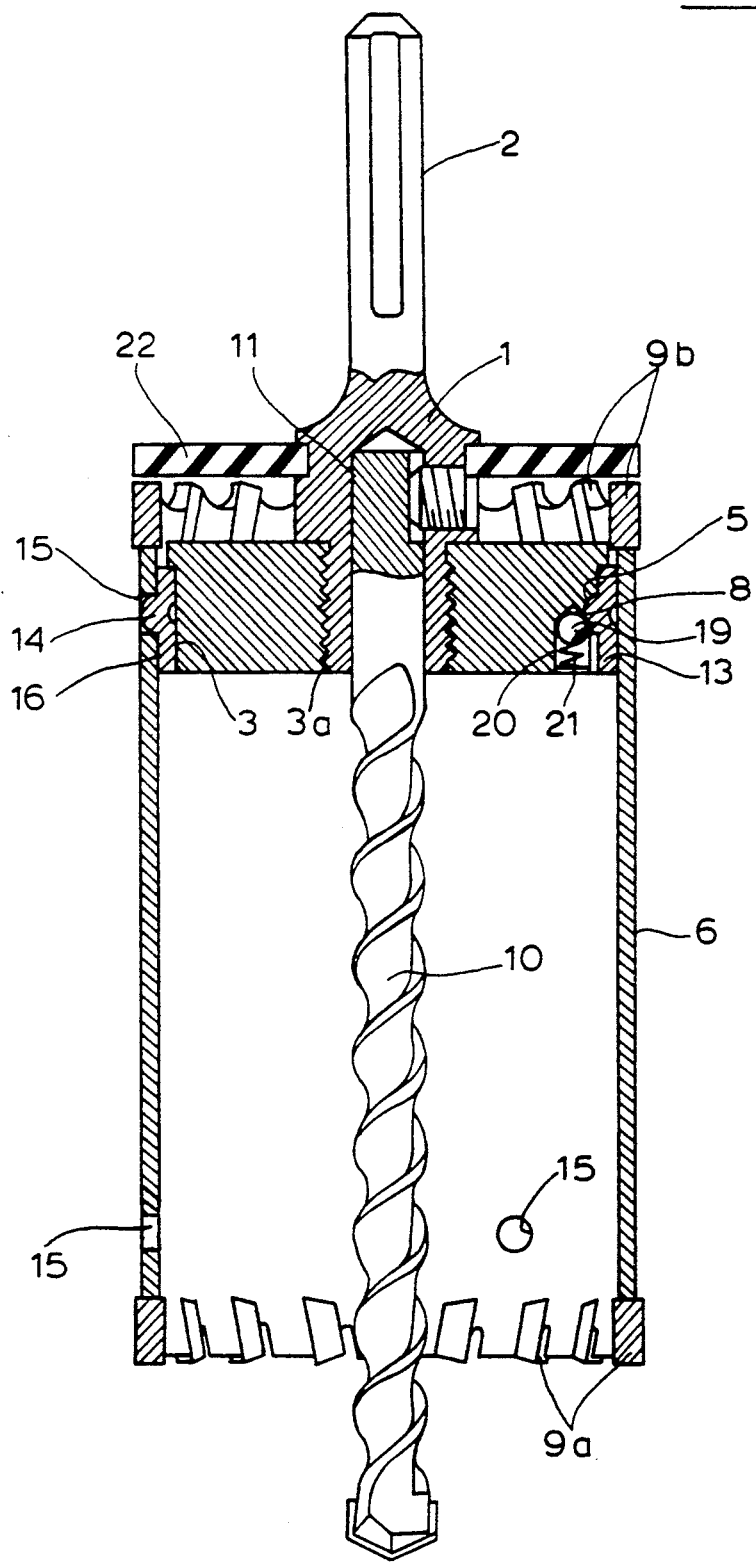
FIG. 1 is a vertical cross-sectional view of a core drill in accordance with this invention.

In FIG. 1, a core body 6 having a straight or uniform diameter is provided, and cutting blades 9a are provided at the peripheral edges of one end opening of the core body 6 and blades 9b are provided at the other end. These cutting blades 9a and 9b can either both be of the same type, or of different types for cutting different types of materials. A core body mounting part 3 having an annular shape is secured by a threaded connection 3a to the lower end of the base 1.

In order to couple together the base 1 and the core body 6, a coupling ring 13 (FIGS. 1 to 3) is placed in a designated rotational position on the inner surface near the end of the upper opening in the core body. This coupling ring 13 is comprised of a resilient annular plate sized to fit closely and elastically against the inner surface of the core body 6. On its inner surface, the ring 13 is provided with multiple inwardly extending locking protrusions 8 corresponding to those which fit in the locking grooves 5. In addition, multiple outwardly extending locking protrusions 14 are provided at equal intervals on the outer surface of the coupling ring 13 at positions different from those of the locking protrusions 8. When the coupling ring 13 is positioned into the core body 6, these locking protrusions 14 are locked from the inside into locking holes 15 formed at annularly spaced intervals in the core body 6, thus making it impossible for the rotational position of the coupling ring 13 to shift relative to the body 6. Further, in order to prevent the movement of the coupling ring 13 in the axial direction with respect to the core body 6, a groove 16 (FIG. 3) in the core body 6 receives the ring 13 and locks the outer periphery of the coupling ring 13, the groove 16 being provided around the inner surface of the core body 6.

Figure 2:
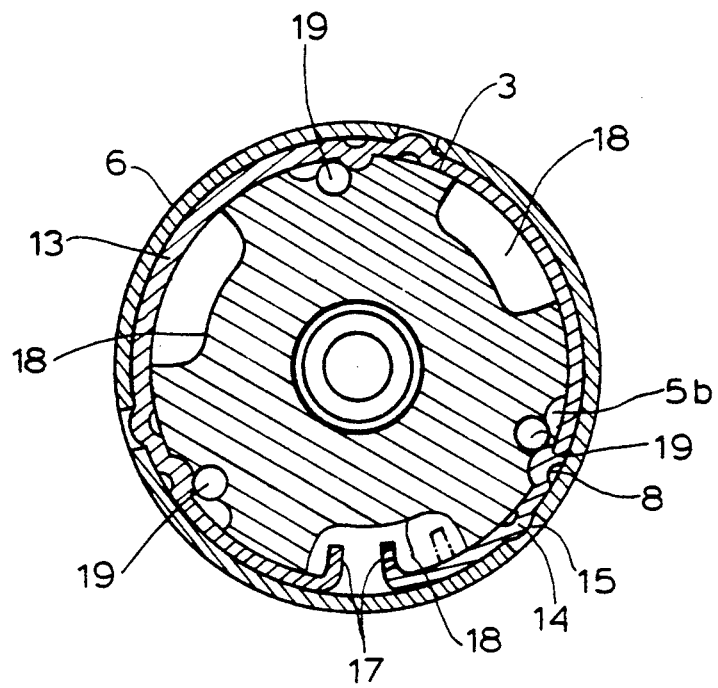
FIG. 2 is a cross-sectional view taken along the line A—A in FIG. 1.
Figure 3:
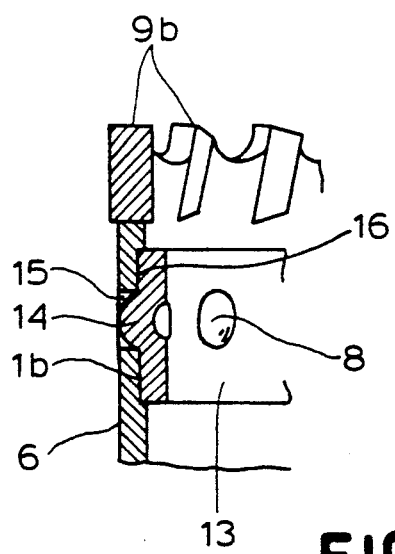
FIG. 3 is a partial cross-sectional view showing the condition of the insertion of the coupling ring into the core body.

In order to mount and remove the coupling ring 13 onto and off of the core body 6, the two ends of the coupling ring 13 are bent inwardly so as to form tabs 17 (FIG. 2). When removing the coupling ring 13 from the core body 6, the two tabs 17 are squeezed together against the elastic force of the coupling ring 13. If the elastic force of the coupling ring 13 is strong, although not shown in the drawings, a screw member or something similar can be provided bridging the space between the two tabs 17 in order to change the distance between the tabs 17.

A plurality of annularly spaced recesses or notches 18 (FIG. 2) are provided in the core body mounting part 3 and the tabs extend into one of the notches 18 so that the tabs 17 do not become an obstruction when fitting the core body mounting part 3 into the coupling ring 13 during the coupling together of the base 1 and the core body 6.

Stopper or locking balls 19 are provided so that they move freely in and out of the horizontal grooves 5b of the locking grooves 5 from inside the core body mounting part 3, and they are housed together with spring 21 inside housing holes 20 provided facing the horizontal grooves 5b of the locking grooves 5 from the bottom edge surface of the core body mounting part 3. A part of each stopper ball 19 protrudes into the groove 5b under the force of the springs 21.

To assemble the parts, first the coupling ring 13 is coupled to the body 6 by squeezing the tabs 17 together and locating the outer protrusions 14 in the holes 15. The inherent resilience of the ring 13 against the body 6 holds the parts together when the squeezing force on the tabs is released. When the base 1 and the core body 6 are coupled together, the core body mounting part 3 is placed into the coupling ring 13 so that the locking protrusions 8 enter the vertical grooves 5a of the locking grooves 5, and then the parts are turned relative to each other so that the locking protrusions 8 move toward the ends of the horizontal groove 5b. This action causes the locking protrusions 8 to move past the stopper balls 19 and reach the locking end points and, unless the base 1 and the core body 6 are intentionally turned in the loosening direction, the locking protrusions 8 are held at the locking end points and the coupled relationship between the base 1 and the core body 6 is securely maintained. It should also be noted that the direction of the groove 5b relative to the turning force on the part 6 during a drilling operation is such that the force tends to move the protrusions 8 toward the ends of the grooves 5b and not toward the balls 19.

It should also be noted that, in the drawings, 22 is a cover member which is attached to the base 1 end and which covers the cutting edges of the cutting blades 9 of the core body 6, and it is made of a rubber material or something similar.

With the core drill of this invention having the composition described above, because the core body has hole-cutting blades provided at the peripheral edges of both openings and holes 15 are provided adjacent each end of the body 6, either of the core body's sets of hole-cutting blades can be used simply by changing the coupling ring to the inner surface of the other core body opening. Consequently, it is possible to quickly deal with breakage of the hole-cutting blades when the core drill is used in applications such as a rotary hammer drill, thus improving work efficiency. In addition, the core body can be used for a longer length of time, thus making it advantageous from the viewpoint of the effective use of materials. Furthermore, unless the base and the core body are intentionally turned in the loosening direction to move the protrusions 8 past the balls 19, the coupled relationship between the base and the core body is maintained unchanged and there is no looseness or play during use, thus providing consistently reliable hole-cutting.

What is claimed is:

1. A core drill comprising a base having a shank in the center of its top surface and a core body mounting part formed on a peripheral surface thereof, hook-shaped locking grooves which are each comprised of a vertical groove followed by a horizontal groove and which are formed at multiple locations on a peripheral surface of said core body mounting part; a cylindrically-shaped core body which is provided with hole-cutting blades around the peripheral edges at both end openings thereof; a coupling ring from the inner surface of which project locking protrusions that lock with said locking grooves, and which is selectively placed into a designated position on the inner surface of the end openings in the core body; and stopper balls which are arranged inside said core body mounting part and which are supported by springs so that they move in and out of said locking grooves and hold the locking protrusions at locking end points inside the locking grooves.

* * * * *